United States Patent [19]
Bohner

[11] Patent Number: 5,517,899
[45] Date of Patent: May 21, 1996

[54] HYDRAULIC SERVOSYSTEM WITH EXTERNALLY CONTROLLABLE SETTING ASSEMBLY

[75] Inventor: Hubert Bohner, Boeblingen, Germany

[73] Assignee: Mercedes-Benz AG, Germany

[21] Appl. No.: 303,044

[22] Filed: Sep. 8, 1994

[30] Foreign Application Priority Data

Sep. 8, 1993 [DE] Germany .................. 43 30 338.2

[51] Int. Cl.⁶ .................. F15B 9/10; B62D 5/06
[52] U.S. Cl. .................. 91/375 A; 180/143; 60/393; 91/459
[58] Field of Search .................. 91/370, 371, 372, 91/375 A, 385, 386, 427, 453; 60/401, 393; 180/143

[56] References Cited

U.S. PATENT DOCUMENTS

| | | | |
|---|---|---|---|
| 4,131,176 | 12/1978 | Ruoff | 180/131 |
| 4,621,703 | 11/1986 | Breitweg | 91/375 A X |
| 4,632,204 | 12/1986 | Honaga et al. | 91/371 X |
| 4,730,687 | 3/1988 | Chikuma et al. | 91/375 A X |
| 4,793,433 | 12/1988 | Emori et al. | 180/143 |
| 5,046,573 | 9/1991 | Jones | 180/143 |
| 5,046,574 | 9/1991 | Goodrich, Jr. et al. | 180/143 |
| 5,070,958 | 12/1991 | Goodrich, Jr. et al. | 180/143 |

FOREIGN PATENT DOCUMENTS

| | | |
|---|---|---|
| 2818754 | 11/1979 | Germany . |
| 3303063 | 6/1984 | Germany . |
| 2652815 | 10/1985 | Germany . |
| 3414891 | 10/1987 | Germany . |
| 85/02380 | 6/1985 | WIPO . |

*Primary Examiner*—John E. Ryznic
*Attorney, Agent, or Firm*—Evenson, McKeown, Edwards & Lenahan

[57] ABSTRACT

A fluidic, in particular a hydraulic, servosystem has an input which can be actuated at will and an output which is elastically drivingly connected thereto, with a relative movement made possible by the elastic connection and dependent on the magnitude of the forces or moments transmitted between the input and the output. The relative movement is transmitted, as between the input and the output setting stroke, to a servovalve which can additionally also be controlled externally for controlling a fluidic servomotor which is drivingly coupled to the output.

20 Claims, 2 Drawing Sheets ed to the wheels of the

HYDRAULIC SERVOSYSTEM WITH EXTERNALLY CONTROLLABLE SETTING ASSEMBLY

BACKGROUND AND SUMMARY OF THE INVENTION

The present invention relates to a fluidic, in particular hydraulic, servosystem having an input which can be selectively actuated and an output which is drivingly connected thereto with limited elastic play. A relative movement, which is made possible by the elastic play and is dependent on the magnitude of the forces or moments transmitted between the input and the output, is transmitted between the input and the output as a setting stroke to a servovalve which can additionally also be controlled externally and controls a fluidic servomotor which is drivingly coupled to the output.

In non-track-bound motor vehicles, servosystems configured as power steering systems are used to a great extent to facilitate the steering work of the driver. In such power steering systems, the input is usually a steering wheel or is drivingly connected thereto, whereas the output, assisted by the servomotor, deflects the steered vehicle wheels.

It is known in principle to provide such a power steering system in motor vehicles so that it can be actuated, on the one hand, at will by the driver and, on the other hand, by an external control which makes it possible, for example, to follow a predetermined track or also to carry out obstacle avoidance maneuvers with the vehicle without intervention by the driver.

In a hydraulic power steering system of the type described in DE 3,414,891 C2, the external control intervenes in the hydraulic return flow which normally leads from the servovalve to a hydraulic reservoir. By damming up the return flow, a hydraulic pressure can be produced which, via corresponding control channels, is capable of acting in different ways on mutually opposed end faces of a control slide of the servovalve and thus of adjusting the servovalve. In this way, the servomotor can then be actuated by external control of the servovalve to deflect the steered wheels of the vehicle.

This known system requires servovalves which have a so-called open center, i.e. in a central position are constantly flowed through by the hydraulic medium while feeding the return flow. Additionally, external steering intervention into positions which deviate from the central position of the servovalve is only possible if a return flow also occurs in these valve positions. Typically, however, servovalves through which there is normally a flow block the return flow off in their end positions in order to be able to feed the full power of the hydraulic pressure source to the servomotor if required.

In that known system, there must thus still be a certain return flow even in end positions of the servovalve in order to make external control possible. However, this is the equivalent of the pressure source having to operate with excessive power even in end positions of the servovalve. Moreover, the damming-up of the return flow involves relatively intense heating of the hydraulic medium because additional throttles become active in the dammed state.

DE 2,652,815 C2 combines a power steering system, which can be controlled at will, with an additional hydromotor which can be controlled externally, in which the system is permanently drivingly connected to the wheels which steer the vehicle and is capable of operating independently of the servomotor. Apart from the fact that, in this system, the constructional outlay is undesirably large, it must be taken into account that the additional hydromotor always has to be moved as well in the case of normal intentional steering of the vehicle. Accordingly, this movement as an additional, constantly acting steering resistance, can impede rapid steering manoeuvres.

It is further known from DE 2,818,754 A1 to provide the vehicle steering system with an externally controllable servomotor which acts on the steering wheel or the wheel-side part of the steering shaft. In this case, too, the additional steering resistance caused by the servomotor, in particular in the case of rapid steering manoeuvres, is disadvantageous in addition to the large constructional outlay. Moreover, the return of the steering system can be impeded by increased friction in the steering column.

DE 3,303,063 A1 and WO 85/02380 relate to hydraulic power steering systems in which the servovalve is a rotary slide assembly whose parts are directly connected to the input side and to the output side of a divided steering shaft. The input-side and output-side parts of the steering shaft are drivingly connected to one another in an elastic manner by a torsion bar. Relative rotations between these parts of the steering shaft are limited by corresponding stops integrated in the servovalve.

An object of the present invention is to provide a servosystem with particularly little constructional outlay, the intention being, in particular, for servovalves with a closed center also to be usable.

This object has been achieved according to the present invention in that parts which are drivingly coupled to the servovalve by an externally controllable setting assembly can be adjusted relative to one another at the input and at the output.

The present invention is based on the general recognition of intervening directly in the drive transmission between the input or output and the servovalve in the case of external control in order to bring about a setting stroke of the servovalve. It is particularly advantageous that servovalves of any desired type can be used in principle, including, in particular, servovalves with a closed center.

According to one presently preferred embodiment of the invention, the externally controllable setting assembly can be effective directly between the input and the output and can make a controlled relative movement possible between the input and the output.

It is further advantageous that the setting assembly can assume a dual function, if required, in that it brings about the relative adjustment between the input and the output, in the case of external control intervention, and thus corresponding actuation of the servomotor. In the case of normal intentional control, the setting assembly effects only a restoring force retroacting on the input and a corresponding restoring moment in order to make a resistance analogous to the respective setting force of the servomotor able to be felt at the input.

According to a further advantageous embodiment of the present invention, the externally controllable setting assembly can be arranged in the drive transmission between the servovalve and the input or output parallel to an elastic transmission element which brings about the elasticity of the play between the input and the output. Thereby, the input and the output are drivingly coupled. In this manner, the setting assembly can operate virtually without power or with little power when adjusting the servovalve because, the elastic tension of the elastic transmission element has no influence on the actuation resistance of the servovalve.

If the servosystem according to the present invention is configured as a power steering system to transmit torques, a rotary slide is preferred as the servovalve between it achieves a particularly compact and simple construction.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
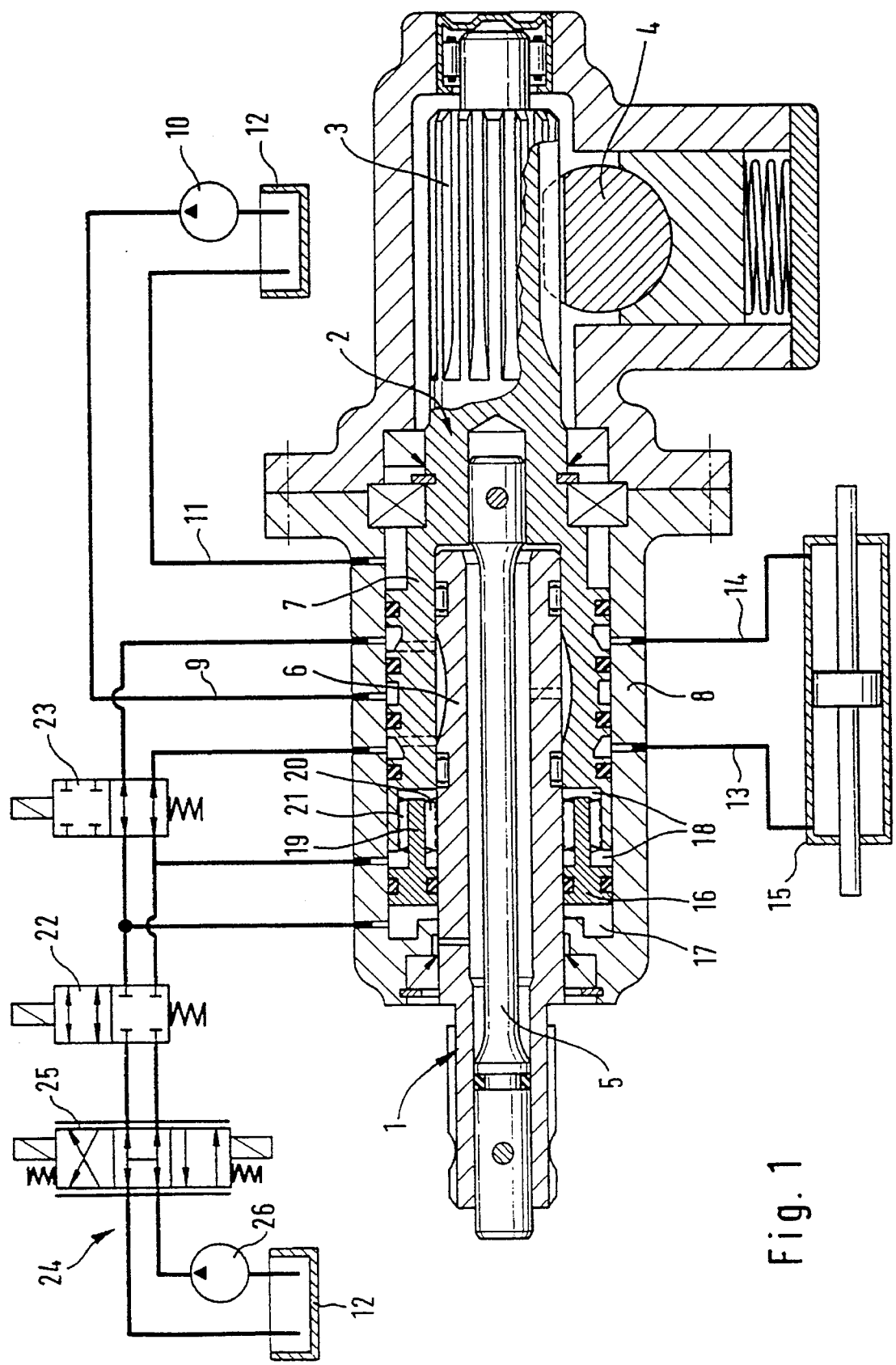
FIG. 1 is an axial sectional view of a first embodiment of the present invention in the form of a motor vehicle power steering system.

The motor vehicle power steering system illustrated in FIG. 1 has a divided steering spindle with an input part 1 and a coaxial output part 2. The input part 1 is connected securely against rotation to a conventional steering wheel (not illustrated), while the output part 2 drivingly interacts, via a pinion 3 arranged thereon, with a toothed rack 4 which, in turn, actuates the vehicle steered wheels (not illustrated) via conventional steering levers or the like connected to said toothed rack.

The input part 1 and the output part 2 are drivingly connected to one another via a torsion bar 5 with mutual rotational elasticity. The possible relative rotation between the input part 1 and the output part 2 is limited by stops (not illustrated) on both sides of a central position. The torsion bar 5 is accommodated in an axial bore of the coaxially arranged input part 1 and output part 2.

The end of the input part 1 facing the output part 2 is configured as a rotary slide 6 which interacts with a control sleeve 7, sheathing the slide 6 and arranged securely against rotation on the output part 2, thereby forming a servovalve 6, 7.

The control sleeve 7 is arranged inside a housing 8. Various annular spaces between the control sleeve 7 and the housing 8 are separated from one another by seals via which the servovalve 6, 7 is connected in a generally known manner to the pressure line 9 of a hydraulic servopump 10 or another hydraulic pressure source and a return line 11 which leads to a hydraulic reservoir 12 to which the suction side of the servopump 10 is connected. Moreover, the servovalve 6, 7 is also connected to two operating ports 13 and 14 which, in turn, communicate in each case with a chamber of a double-acting piston/cylinder assembly 15 which, in turn, is drivingly connected to the toothed rack 4 or to the output part 2 and can thus act as a servomotor of the steering system.

Depending on the torque transmitted between the input part 1 and the output part 2, a more or less large relative rotation occurs between the input part 1 and the output part 2 in one direction or the other depending on the direction of the torque transmitted. This relative rotation, which attempts to restore the torsion bar 5, causes the rotary slide 6 and the control sleeve 7 to be adjusted relative to one another by a corresponding control path in one direction or the other relative to a central position. It is thus achieved that, when operating the servopump 10 at the operating ports 13, 14, a pressure difference occurs in one direction or the other such that the servomotor formed by the piston/cylinder assembly 15 generates a corresponding setting force. As a result, the actuating force required at the steering wheel or at the input part 1 to actuate the vehicle steering is reduced significantly.

An annular piston 16 is arranged axially displaceably between the input part 1 and the housing 8 so as to separate two annular chambers 17 and 18 from one another inside the housing 8. The chambers 17, 18 can be connected in a manner described below to the operating ports 13, 14 or the two chambers of the piston/cylinder assembly 15.

The annular piston 16 has an annular extension or continuation 19 which engages with an internal oblique toothing 20 in an external oblique toothing on the input part 1 and, via an external straight toothing 21, in a corresponding internal straight toothing on a bush-like extension or continuation of the control sleeve 7. Accordingly, relative rotations between the input part 1 and the control sleeve 7 (or the output part 2) also lead to axial displacement of the annular piston 16.

As long as the annular chambers 17, 18 communicate with the operating ports 13, 14 or the corresponding chambers of the piston/cylinder assembly 15, an axial force analogous to the setting force of the piston/cylinder assembly 15 acts on the annular piston 16 such that the annular piston 16 attempts to turn the input part 1 and the control sleeve 7 or the output part 2 back into their central position relative to one another. As a result, a restoring force is generated and can be felt as an actuating resistance at the input part 1. The magnitude of the restoring force varies analogously to the setting force of the piston/cylinder assembly 15. The foregoing features above are generally known in principle (as can be seen, for example, in WO 85/02380).

According to the present invention, a valve assembly with the switchover valves 22, 23 is provided, by way of which the annular chambers 17, 18 are connected either to the operating ports 13, 14 (or the chambers of the piston/cylinder assembly 15) or to an external pressure control 24.

This pressure control 24 has a control valve 25 via which the annular chambers 17, 18 (after the valves 22, 23 have been switched over into the unillustrated switching positions but as can be readily understood by one of ordinary skill in this art) can be connected to the discharge side of a pump 26 or the reservoir 12 so as to be controllable in one direction or the other to generate a pressure difference which is active between them. The control valve 25 is automatically controlled externally, specifically as a function of a driving manoeuvre, for example an obstacle avoidance manoeuvre. In this way, an externally controllable axial force acts on the annular piston 16 in one direction or the other, with the consequence that the input part 1 or the rotary slide 6 and the output part 2 or the control sleeve 7 are rotated relative to one another with axial displacement of the annular piston 16. The piston/cylinder assembly 15 thus generates a setting force analogous to the axial displacement of the annular piston 16 and is correspondingly capable of actuating the vehicle steering system, provided that the input part 1 or the steering wheel connected securely against rotation thereto is not held tightly with correspondingly great force or actuated in any other way by the driver.

A modification of the embodiment illustrated in FIG. 1 makes it possible to omit the valve assembly with the switchover valves 22, 23 and to connect the annular chambers 17, 18 permanently to the control valve 25, i.e. no connection can be made between the annular chambers 17, 18 and the operating ports 13, 14. As long as no external control intervention takes place, the control valve 25 assumes the illustrated central position in which no resultant axial force acts on the annular piston 16. The steering system can thus be actuated manually in a conventional manner. In the case of external control intervention, however, the control valve 25 is then adjusted in one direction or the other. Instead of the separate pump 26, the servopump 10 can also be connected, if required, to the pump connection of the control valve 25.

Even in the case of external control intervention, the driver can still actuate the steering system if it is ensured that the pressure difference which can be generated between the annular chambers 17, 18 and thus the axial setting force of the annular piston 16 are sufficiently limited. This is because this setting force can then bring about only a limited actuation resistance at the input part 1, which resistance can be overcome by the driver, if necessary.

Figure 2:
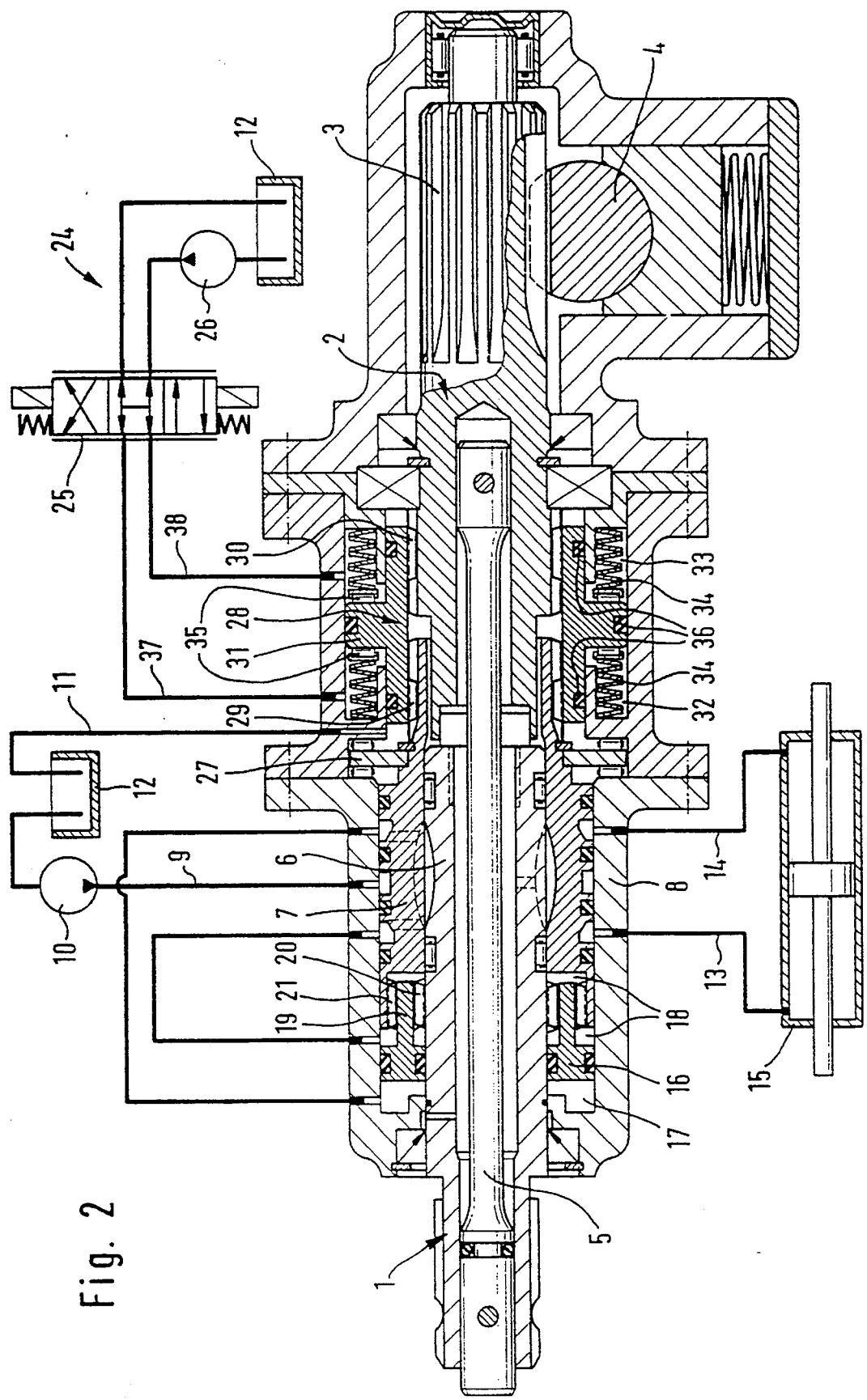
FIG. 2 is an axial sectional view of another embodiment of the present invention.

The embodiment according to FIG. 2 differs from that in FIG. 1 firstly due to the fact that the annular chambers 17, 18 are permanently connected to the operating ports 13, 14 or the two chambers of the piston/cylinder assembly 15.

The main difference between the two illustrated embodiments consists in the fact that the control sleeve 7 in FIG. 2 is connected to the output part 2 so as to be rotatably adjustable. For this purpose, the control sleeve 7, which is mounted axially inside the housing 8 by an annular flange 27, is positively coupled to the output part 2 via a sliding sleeve 28. On one end of the internal circumference, the sliding sleeve 28 has an oblique toothing 29 and at the other end a straight toothing 30. The toothing 29, 30 engages respectively in diametrically opposed external toothings at the adjacent ends of the control sleeve 7 and of the output part 2. During axial displacement of the sliding sleeve 28, the control sleeve 7 thus performs a rotation relative to the output part 2.

The external circumference of the sliding sleeve 28 has a piston 31 formed thereon, like an annular flange, by way of which two annular chambers 32, 33 are separated from one another inside a section of the housing 8. Annular spring assemblies 34 are arranged inside these annular chambers 32, 33 to force the piston 31 and thus the sliding sleeve 28 into a central position. The spring assemblies 34 are supported on the end faces of the piston 31 with interposition of axial rolling bearings 35, such that the piston 31 or the sliding sleeve 28 can be rotated easily even in the case of great pressing-on pressure of the annular spring assemblies 34.

The annular chambers 32, 33, which are blocked off relative to one another and relative to the remaining interior of the housing 8 by seals 36, are connected via ports 37, 38 to the control valve 25 of the external pressure control 24. In the illustrated central position of the control valve 25, there exists a pressure balance in the annular chambers 32, 33, such that the spring assemblies 34 hold the piston 31 and the control sleeve 28 permanently in a central position. The control sleeve 7 and the rotary slide 6 of the servovalve 6, 7 are thus only deflected relative to one another out of their central position if a torque becomes effective between the input part 1 and the output part 2. In this way, the normal intentional actuation of the power steering system is possible.

If, in contrast, a pressure difference is generated between the annular chambers 32, 33, the sliding sleeve 28 is displaced, to a greater or lesser extent, in the axial direction towards the left or right. As a result, the control sleeve 7 rotates relative to the output part 2 and thus also relative to the input part 1 as long as the output part 2 does not move or moves only slightly relative to the input part 1. In this way, external adjustment of the servovalve 6, 7 and thus external actuation of the piston/cylinder assembly 15 for external steering intervention are possible.

In a modification of the embodiment illustrated in FIG. 2, the annular piston 16 and the annular chambers 17, 18 can be omitted, if no restoring force analogous to the setting force of the piston/cylinder assembly 15 is intended to act on the input part 1.

Moreover, the input part 1 can be coupled to the steering wheel (not illustrated) or any other handling device via a control member which reacts as soon as greater forces or moments are transmitted between the steering handwheel or handling device and the input part 1. The control valve 25 is then returned at least partially in the direction of the illustrated central position. In this manner, it is reliably ensured that the driver can actuate the steering system even in the case of an automatic steering intervention counter to the setting direction sought by the steering intervention.

Also in the embodiment according to FIG. 2, the servopump 10 may possibly also take on the task of the pump 26, such that the pump 26 can be omitted. However, the additional pump 26 is advantageous in all embodiments if the control 24 is intended to operate on a pressure level independent of the servopump 10.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A fluidic servosystem, comprising an input configured and arranged to be selectively actuatable, an output drivingly connected with the input, a servovalve, means for providing limited elastic play and relative movement between the input and the output dependent on the magnitude of one of forces and moments transmitted between the input and the output and transmitting the movement as a setting stroke to the servovalve a fluidic servomotor controllable by the servovalve and drivingly coupled to the output, and an externally controllable setting assembly arranged to control setting parts at the input and the output, the setting parts being drivingly connected to the servovalve, so as to externally control the servovalve.

2. The servosystem according to claim 1, wherein the externally controllable setting assembly is constructed to be effective directly between the input and the output and to provide a controlled relative movement between the input and the output.

3. The servosystem according to claim 2, wherein, in normal operation, the setting assembly is arranged to exert a restoring force discernible at the output as actuation resistance which varies analogously to setting force of the servomotor.

4. The servosystem according to claim 1, wherein the externally controllable setting assembly is arranged in a drive connection between the servovalve and one of the input and the output parallel to an elastic transmission element comprising the limited elastic play means between the input and the output and drivingly couples the input and the output for adjusting a part of the servovalve assigned to one of the input and the output relative to one of the input and the output to control the servovalve.

5. The servosystem according to claim 4, wherein the externally controllable setting assembly is constructed to be effective directly between the input and the output and to provide a controlled relative movement between the input and the output.

6. The servosystem according to claim 5, wherein, in normal operation, the setting assembly is arranged to exert a restoring force discernible at the output as actuation resistance which varies analogously to setting force of the servomotor.

7. The servosystem according to claim 4, wherein a restoring assembly is arranged in series with the setting assembly between parts of the servovalve assigned to the input and to the output, and is configured and arranged to exert on the input a restoring force discernible as actuation resistance which varies analogously to the setting force of the servomotor.

8. The servosystem according to claim 1, wherein the servovalve is a rotary slide assembly.

9. The servosystem according to claim 8, wherein the setting assembly comprises an annular piston coaxial with an axis of the servovalve, which annular piston is arranged to be axially displaceable by fluid pressure and configured to interact with toothings associated with the input and the output or with a part of the servovalve assigned to the input or to the output such that the parts are rotated relative to one another during axial displacement of the annular piston.

10. A fluidic servosystem, comprising a selectively actuatable input member and an output member drivingly connected with the input member, means for providing limited elastic play and a relative movement between the input member and the output member dependent on a magnitude of one of forces and moments transmitted between the input member and the output member, a servovalve to which is transmitted as a setting stroke the relative movement between the input member and the output member, the servovalve being arranged to be controlled externally and to control a fluidic servomotor drivingly coupled to the output member, and means for providing relative adjustability of parts drivingly coupled to the servovalve via an externally controllable setting assembly at the input member and at the output member.

11. The servosystem according to claim 10, wherein the externally controllable setting assembly is constructed to be effective directly between the input member and the output member and to provide a controlled relative movement between the input member and the output member.

12. The servosystem according to claim 11, wherein, in normal operation, the setting assembly is arranged to exert a restoring force discernible at the output member as actuation resistance which varies analogously to setting force of the servomotor.

13. The servosystem according to claim 10, wherein the externally controllable setting assembly is arranged in a drive connection between the servovalve and one of the input member and the output member parallel to an elastic transmission element comprising the limited elastic play means between the input and the output and drivingly couples the input and the output for adjusting a part of the servovalve assigned to one of the input and the output relative to one of the input and the output to control the servovalve.

14. The servosystem according to claim 13, wherein the externally controllable setting assembly is constructed to be effective directly between the input member and the output member and to provide a controlled relative movement between the input member and the output member.

15. The servosystem according to claim 14, wherein, in normal operation, the setting assembly is arranged to exert a restoring force discernible at the output member as actuation resistance which varies analogously to setting force of the servomotor.

16. The servosystem according to claim 13, wherein a restoring assembly is arranged in series with the setting assembly between parts of the servovalve assigned to the input member and to the output member, and is configured and arranged to exert on the input member a restoring force discernible as actuation resistance which varies analogously to the setting force of the servomotor.

17. The servosystem according to claim 10, wherein the servovalve is a rotary slide assembly.

18. The servosystem according to claim 17, wherein the setting assembly comprises an annular piston coaxial with an axis of the servovalve, which annular piston is arranged to be axially displaceable by fluid pressure and configured to interact with toothings associated with the input member and the output member or with a part of the servovalve assigned to the input member or to the output member such that the parts are rotated relative to one another during axial displacement of the annular piston.

19. The servosystem according to claim 10, wherein a control member is arranged between the input member and an assigned actuating member so as to react to one of forces and moments transmitted between the input member and the control member and to one of switch off the setting assembly above a threshold value of the forces and moments and control the setting assembly in a reduced setting force direction.

20. The servosystem according to claim 10, wherein a control member is arranged between the input and an assigned actuating member so as to react to one of forces and moments transmitted between the input and the control member and to one of switch off the setting assembly above a threshold value of the forces and moments and control the setting assembly in a reduced setting force direction.

* * * * *